Nov. 4, 1930.  J. W. JOHNSTON  1,780,234
BRAKE DRUM
Filed Oct. 2, 1926
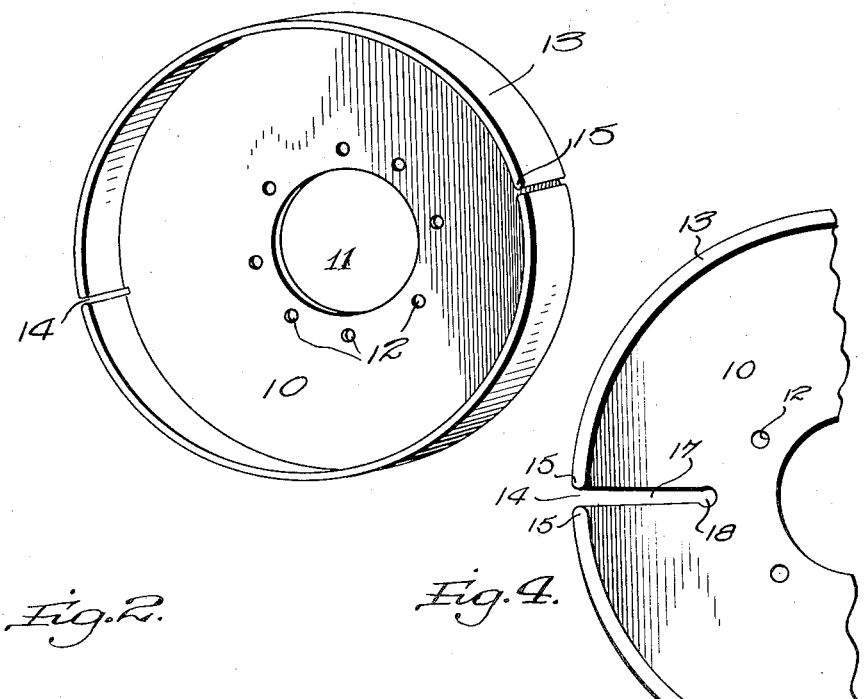
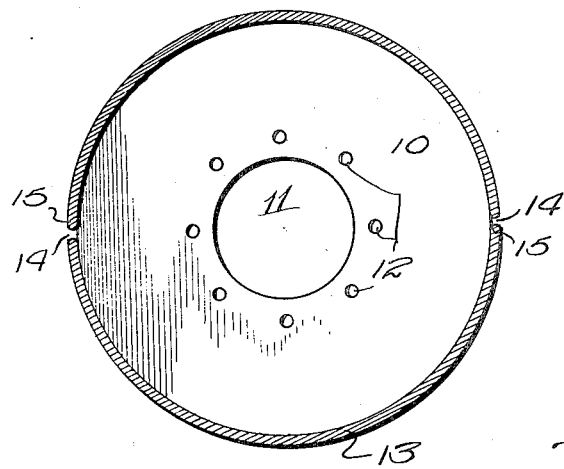
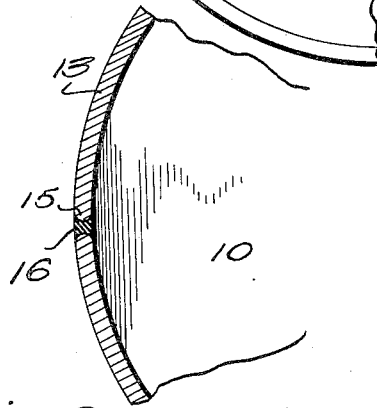
Inventor
J. W. JOHNSTON
By
Attorney Patented Nov. 4, 1930

1,780,234

UNITED STATES PATENT OFFICE

JOSEPH W. JOHNSTON, OF STEUBENVILLE, OHIO

BRAKE DRUM

Application filed October 2, 1926. Serial No. 139,144.

This invention relates to brake drums and more particularly to automobile brake drums.

The principal object of this invention is to provide a brake drum which will reduce or eliminate the squeak common to the brake drums heretofore constructed.

Another object of this invention is to provide a discontinuous flange for a brake drum whereby the tone vibrations are reduced or destroyed and squeaking of the drum is prevented.

A further object of this invention is to provide the flange of a metallic brake drum with slots or openings extending transversely thereof and to insert in such openings a vibration-minimizing and strengthening material.

Other objects and advantages will appear in the course of the following description.

Up to the present time various attempts have been made to eliminate the squeak or tone vibration encountered in the use of the automobile brake drums employed but these attempts have been directed to modifying the brake band or lining. However I have discovered that the squeak is caused by the tone vibration produced in the brake drum itself and that by providing the flange of the brake drum with a plurality of spaced openings such vibration is materially reduced or destroyed.

In the accompanying drawings I have shown one embodiment of my invention. In this showing, Figure 1 is a perspective view, Figure 2 is a vertical section, Figure 3 is a section of a portion of the drum with vibration-minimizing material secured in one of the slots or openings, and Figure 4 is a detail view of a modified construction.

With reference to the accompanying drawings, the numeral 10 indicates the customary disk-like portion of an automobile brake drum provided with a hub opening 11 and hub bolt openings 12. Preferably formed integrally with said disk portion is the customary flange portion 13. The flange 13 is composed of a plurality of spaced arcuate sections so arranged as to provide openings 14 between the adjacent ends of the arcuate sections. In the accompanying drawings I have shown the flange portion 13 composed of but two arcuate sections but it is obvious that I may form the flange 13 of any desired number of such arcuate sections. The ends of the arcuate sections of the flange 13 are rounded or beveled as at 15 so that these ends will not unduly wear or tear the brake band or lining.

By constructing the flange 13 of a brake drum in the manner indicated above the tone vibrations commonly produced in such a brake drum are eliminated or materially reduced.

In addition to providing the flange 13 with openings 14 to destroy tone vibrations I may insert vibration-minimizing material 16 into the openings 14. This material also serves as strengthening means for the flange. Such material may be the same metal as employed in making the brake drum, some other metal, hard rubber, felt packing material or the like. It is particularly advantageous to employ such material when the flange 13 is provided with a considerable number of slots or openings 14.

In Figure 4, I have shown a modified construction of my device in which the disk portion 10 of the drum is provided with openings or slots 17 extending partially thereacross. The slots 17 preferably communicate with or are continuations of the slots or openings 14. The ends of the slots 17 are enlarged as at 18. By this construction I provide a drum having substantial flexibility and in the use of which squeaking is substantially eliminated.

An important feature of my invention is that the drum may be composed of a single sheet of metal and may be manufactured by forming such metal in a single stamping. This is of special importance since my improved brake drum may be manufactured as easily and economically as the brake drums heretofore employed. From the foregoing description it will be readily apparent that I have provided an extremely simple and inexpensive construction which will substantially eliminate the squeaking of a brake drum.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. A brake drum comprising a metallic disk-like member and a discontinuous substantially cylindrical brake engaging flange formed integrally with said disk-like member at the periphery thereof whereby tone vibrations may be substantially eliminated in said drum.

2. A brake drum comprising a metallic disk provided at its periphery with a cylindrical brake engaging flange, said flange being provided with a plurality of spaced openings extending transversely thereof to substantially eliminate tone vibrations in said drum.

3. A brake drum comprising a metallic disk and a substantially cylindrical brake engaging flange formed integrally with said disk and extending from the periphery thereof, said flange comprising a plurality of spaced arcuate sections whereby tone vibrations may be substantially eliminated in said drum.

4. A brake drum comprising a metallic disk and a substantially cylindrical brake engaging flange formed integrally with said disk and extending from the periphery thereof, said flange comprising a plurality of spaced arcuate sections whereby tone vibrations may be substantially eliminated in said drum, the ends of each of said sections being rounded.

5. A brake drum including a substantially cylindrical brake band engaging face, a portion of said drum being slotted in such a manner as to destroy tone vibrations in said drum.

6. A brake drum comprising a disk and a flange carried thereby, said disk and said flange each being provided with cut-away portions therein.

7. A brake drum comprising a member of substantially cylindrical form, composed of free-standing segments supported at one annular edge by a disk occupying a plane normal to the axis of rotation of the drum, said segments being of sufficient arcual length to prevent their yielding unduly under the pressure of the brake band.

8. A brake drum comprising a cylindrical metallic member having a smooth surface adapted to cooperate with an inner or an outer brake band, said member having been converted into a series of free-standing segments of equal length by narrow saw cuts.

In testimony whereof I affix my signature.

JOSEPH W. JOHNSTON.